July 28, 1959 J. E. FROST 2,897,031

TELEPHONE BASE DIRECTORY

Filed June 2, 1958 2 Sheets-Sheet 1

INVENTOR.
JAMES ERNEST FROST
BY
Huebner & Worrel
ATTORNEYS.

July 28, 1959 J. E. FROST 2,897,031

TELEPHONE BASE DIRECTORY

Filed June 2, 1958 2 Sheets-Sheet 2

INVENTOR.
JAMES ERNEST FROST
BY
Huebner & Worrel
ATTORNEYS.

United States Patent Office 2,897,031
Patented July 28, 1959

2,897,031

TELEPHONE BASE DIRECTORY

James Ernest Frost, Los Angeles, Calif.

Application June 2, 1958, Serial No. 739,091

6 Claims. (Cl. 312—183)

This invention relates to a card index or directory adaptable for attachment to the base of a telephone.

With the advent of direct distance dialing, permitting dialing of long distance telephone calls throughout the nation by the caller, a readily available selective directory of telephone numbers all over the country becomes of increasing importance. For instance, it is presently possible to place a transcontinental telephone call by direct dialing without the delay of the intervention of a long distance or "information" telephone operator, if the caller knows the telephone number he wishes to reach in the distant city.

It will, of course, be impractical to have available in each home and office a complete set of normal telephone directories for all the cities and towns in the United States which the telephone subscriber might desire to call. The advantage of having a handy single directory listing numbers frequently called throughout the country will therefore be obvious.

Flip-card type indices are well known and used generally in business, but many of them are quite elaborate in design and construction, expensive to manufacture and maintain, bulky, and not readily useable in direct association with a telephone.

An object of the present invention is to provide a directory which will be attachable to the base of a telephone and will be readily available when telephone information is required.

Another object of the invention is to provide a directory which is compact but at the same time replete with desired information.

A further object of the invention is to provide a directory which can be kept current easily by quick insertion or removal of information cards.

Another object of the invention is to provide a mechanical directory of the character mentioned which is simple in design and which is easy and inexpensive to manufacture, assemble and mount, without structural changes in the telephone instrument itself, and without interference with the normal functions of the telephone instrument.

A further object of the invention is to provide a directory which will make quickly available the information contained therein.

Another object of the invention is to provide a telephone directory which will give readily information much more pertinent and extensive than that contained in the ordinary telephone directory.

A further object of the invention is to provide a directory which can be kept current with a minimum of effort and expense.

The invention also comprises novel details of construction and novel combinations and arrangements of parts which will be apparent from the following description and drawings which, however, merely describe preferred embodiments of the present invention, and which are given for purposes of illustration and example only.

Figure 1:
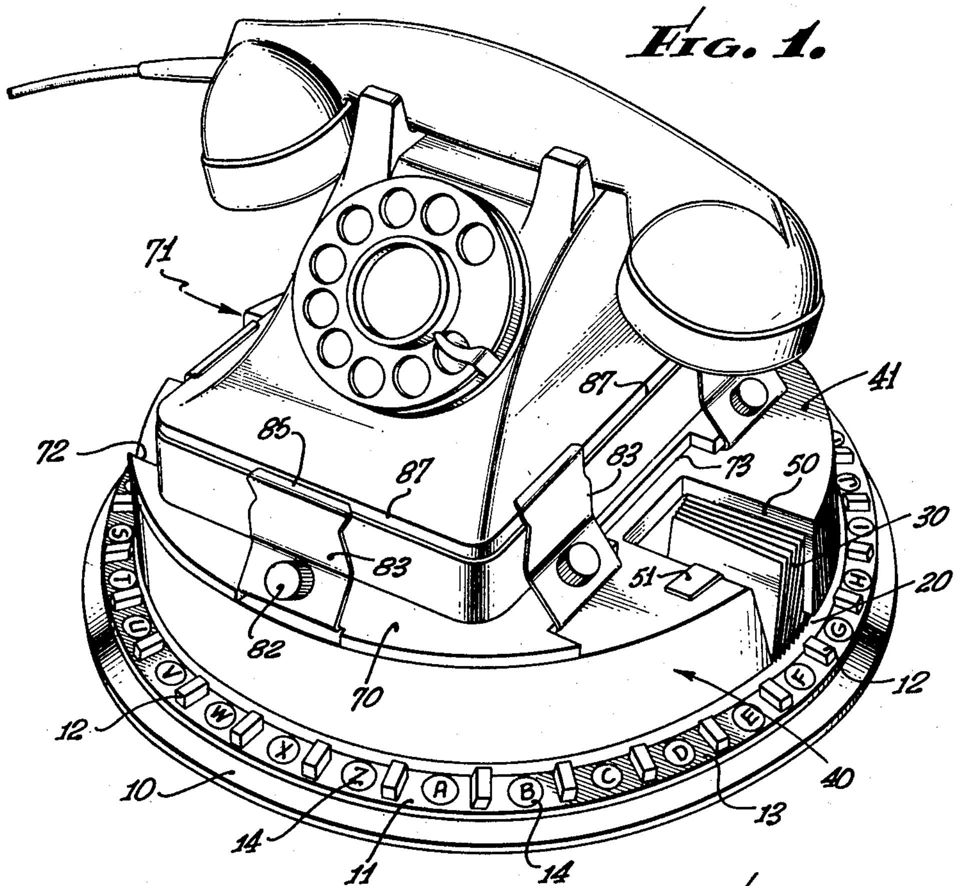
Figure 1 is a perspective view of the directory mounted on the base of a dial telephone instrument.

A circular baseplate 10 has slideably mounted on it a circular ring disc 11, preferably of molded plastic material and generally of slightly less outside circumference than the outside circumference of the circular baseplate 10.

Mounted on the outside perimeter of the disc 11 are a series of protruding knobs 12 which, in the preferred embodiment of the device shown in the drawings, are of rectangular outline, in order to more efficiently serve in one capacity as spacers, but it will be understood that they may be cubular or noduled or of any other shape which will allow them to be used as means for slideably moving the disc 11 on the base 10.

The flat spaces 13 between the knobs 12 carry an alphabetical or numbered key index, having the individual parts 14 thereof spaced apart by the knobs 12. The key index may be provided by etching or otherwise marking the alphabet letters or numbers 14 directly on the disc 11 or by mounting on the flat spaces 13 separate flat pieces bearing the letters or numbers 14.

The disc 11 has a raised platform 20 spaced inwardly from the flat spaces 13 and the knobs 12. Said platform 20 has parallel grooves 21 extending across the platform 20 and spaced apart from each other.

Around the inside edge of the circular ring disc 11 is a collar 22, which may be formed as an integral part of said disc 11 or may be rigidly mounted thereon. Said collar 22 abuts on the platform 20 and forms a limiting border for said platform 20 and the inside of the grooves 21. The collar 22 has at its base a rectangular channel 23.

Cards 30 have protruding spurs 31 and 32 and each card has a fold line 33. When ready to be mounted in the directory they are folded forward along the fold line 33, and as thus folded each card is inserted in a separate groove 21, with the folded spur 32 inserted in the channel 23.

At spaced intervals along the outside edge of the platform 20 are studs 34 which are rigidly mounted clear of the grooves 21 and extend slightly beyond the outside edge of the platform 20, thereby serving as confining means for a spring 35 hereinafter described.

Mounted under the studs 34. resting on the folded spur 31, and following the outside circumference of the platform 20 is a spring 35, which in turn impinges on the edge 36 of each card 30 and serves to hold each card 30 releasably in groove 21. Removal of a card 30 can be accomplished by exerting lateral sliding pressure of the card 30 along a groove 21 and against the spring 35, until the spur 31 is free of the channel 23, whereupon the card 30 can be readily lifted out of the groove 21. By reverse action the card 30 can be reinserted in the groove 21 when desired.

A circular cover 40 has a flat top 41 and side 42. The inside circumference of cover 40 is slightly greater than the outside circumference of the platform 20 with the studs 34 mounted thereon, so as to permit the entire circular ring disc 11 to move freely in relation to said cover 40 as hereinafter described.

Rigidly mounted inside said cover 40 is the circular footing 43. Said footing 43 is deeper than the side 42 of the cover 40, and fits into a circular groove 44 cut into the circular baseplate 10. The radius of said groove 44 is slightly less than the radius of the collar 22. The height of said footing 43 is substantially greater than the combined heights of the platform 20 and the cards 30 mounted thereon. Thus, when the cover 40 is in position on the device, it is seated on the circular baseplate 10 by means of the footing 43 which is resting in the groove 44, while the bottom of the side 42 is clear of the circular ring disc 11, and the platform 20, with the cards 30 mounted in the grooves 21, is then loosely disposed between the inside surface of the side 42 and the outside surface of the footing 43, and free to move circumferentially in the space between the side 42, the footing 43, and the flat top 41.

Figure 4:
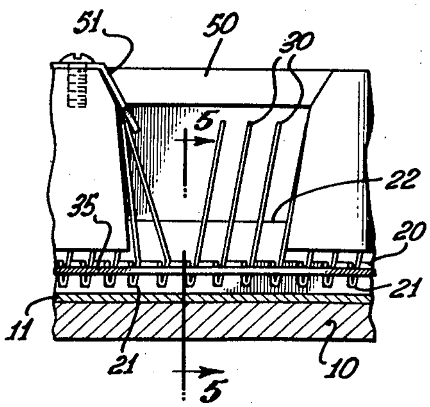
Figure 4 is a cut away side elevation of a portion of the directory taken on the line 4—4 of Figure 3.
Figure 5:
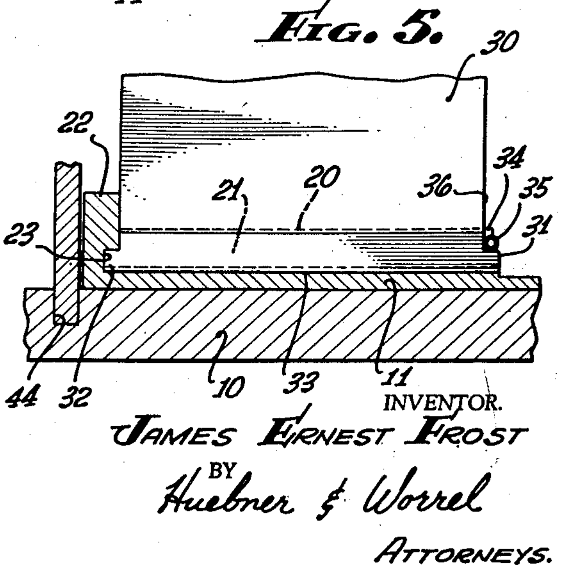
Figure 5 is an enlarged fragmentary section taken on the line 5—5 of Figure 4.
Figure 2:
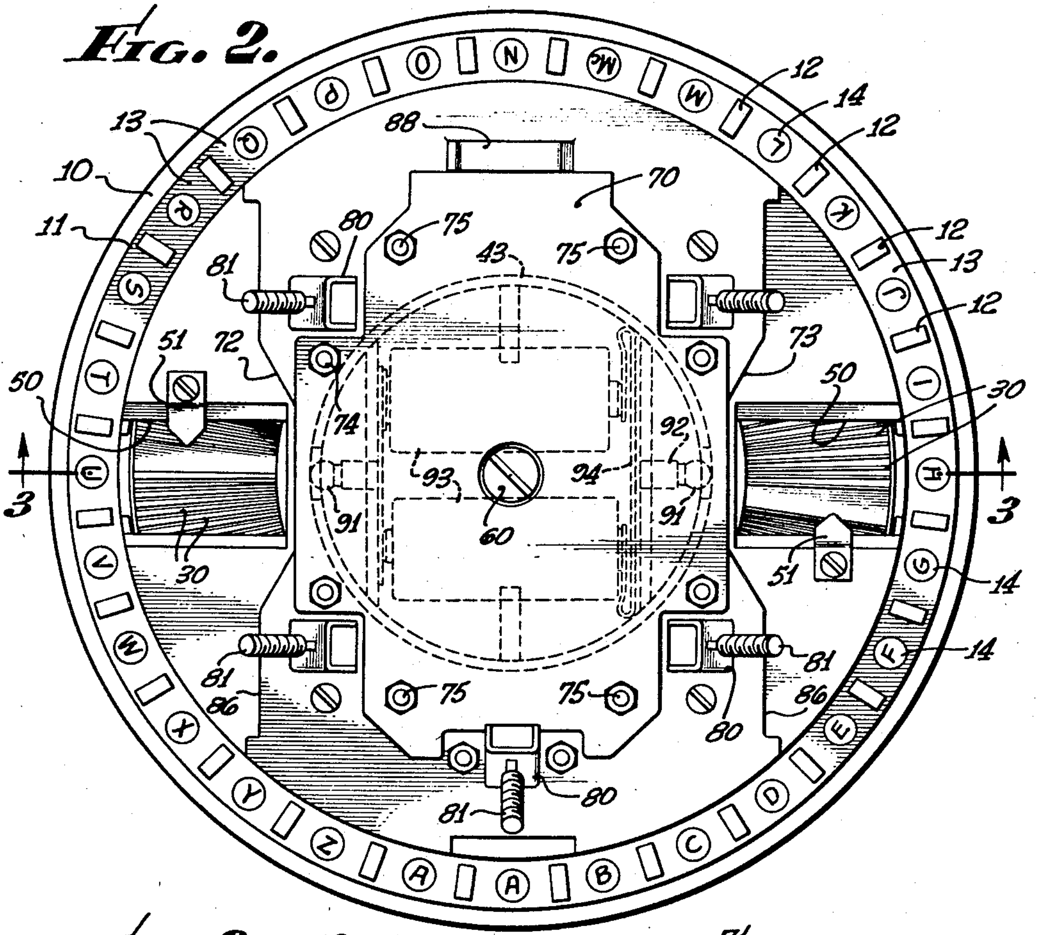
Figure 2 is a plan view, partly sectional, of the directory, with the telephone instrument removed therefrom.

Cut into the cover 40 are viewing ports or openings 50, of sufficient width to permit convenient views of the cards 30 and the information material contained thereon. Mounted on the flat top 41 of the cover 40, and protruding downwardly into said openings 50 are spurs 51, which extend beyond the top of the cards 30, as best shown in Figure 4, and serve as a flip pointer and holder when the circular ring disc 11 is rotatably moved and stopped at desired points.

Figure 3:
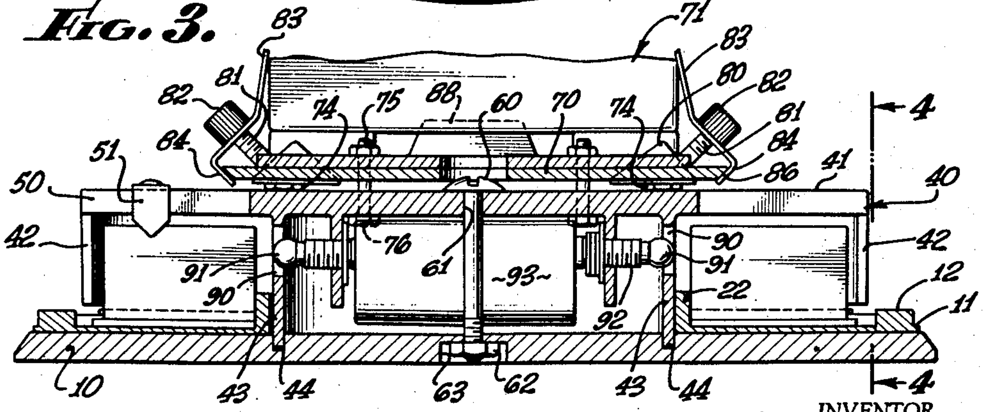
Figure 3 is a cross section of the directory taken on the line 3—3 of Figure 2, with the telephone instrument cut away at the base thereof.

The cover 40 is mounted on the circular base plate 10 by a bolt 60 or other suitable means. In the preferred form of the device shown in the drawing, and particularly at Figure 3, bolt 60 is inserted in a hole 61 in the top 41 of the cover 40 at the center thereof, and has threaded on it a nut 62 which is mounted in a recess 63 in the circular base plate 10. It will be understood that other suitable means of securing the cover 40 to the circular base plate 10 may be provided.

Means are provided for securing the device to a telephone instrument. In the preferred form of the device shown in the drawing, there is provided a platform 70 which is substantially smaller in area than the flap top 41 of the cover 40, but its outside dimensions are sufficient to accommodate the base of a telephone instrument 71. Platform 70 is cut away, as at 72 and 73 so that it clears the openings 50 and permits an unobstructed view of the cards 30 positioned in said openings 50. Platform 70 is spaced from the flap top 41 by means of bolts or lugs 74 which act as legs for platform 70 as well as separators, and are secured to flat top 41 and platform 70 by nuts or flanges 75 and 76.

Mounted on platform 70 by suitable means, such as anchors 80 and bolts 81, having nuts 82 threaded thereon, are clamps 83 which have angled edges 84 and 85. Platform 70 has straight surfaces 86 designated to accommodate angled edges 84 and serve as a seat therefor when the clamps 83 are secured in position. Edges 85 are designed to fit over the ridge or flat surface 87 on the base of the telephone instrument 71. By tightening the nuts 82, the device may thus be securely but releasably fastened to the base of the telephone instrument 71. A buffer 88 may also be provided to firmly position the base of the telephone instrument 71 on the device.

If desired, lighting may be provided at the openings 50 to aid in the viewing of the cards 30 in the openings 50. To provide such lighting, openings 90 may be cut in the footing 43 in the proximity of the openings 50, and light bulbs 91 may be disposed in said openings. Said light bulbs 91 are suitably connected to a source of electric energy, such as by sockets 92, batteries 93, and electrical connections 94.

Figure 6:
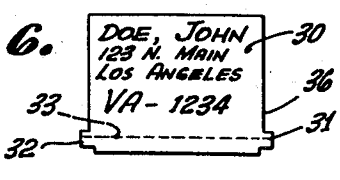
Figure 6 is a front view of one of the directory cards removed from the directory and ready for insertion therein.

In operation, with the telephone instrument mounted on the device, the cover 40 is securely fastened to the base plate 10, but the circular ring disc 11, although its lateral movement is confined by the side 42 and the footing 43, is free to be moved slideably and rotatably by finger pressure on the sides of the knobs 12. The cards 30 are arranged on the platform 20 and in the grooves 21 in relationship to the key index and the individual parts thereof 14, so that when, for instance, the letter D of the index appears opposite an opening 50, cards keyed to the letter D are aligned with the index at said opening 50. For example: if it is desired to find the telephone number of Mr. John Doe, the circular ring disc 11 is turned until the letter D on the index is opposite one of the openings 50, whereupon the cards keyed to the letter D will be visible in the opening 50, and the rotational movement of the circular ring disc 11 is continued until the card for Mr. John Doe appears under the spur 51. As illustrated in Figure 6 of the drawing, it will thus appear on the card that Mr. John Doe, who resides at 123 North Los Angeles, can be reached by telephone at VA–1234.

Only one opening 50 is required for the proper operation of the directory, but directory shown in the drawing has two openings 50. When two openings 50 are provided, they are arranged at opposite sides of the device and the device will then be able to utilize both sides of the cards 30 for informative purposes. One suggested manner of arranging the card information when two openings 50 are provided is to use one opening for a business index, in which case business information is displayed on one side of a card 50 and personal information on the other side of the same card. Using the example above for Mr. John Doe, one side of a card could be printed with the business information that Mr. John Doe has a place of business at 123 North Los Angeles, and that his business telephone number is VAndike 1234. Whereas, the other side of the same card could be printed with the information that Mr. John Doe resides at say 244 Sunset Boulevard, and that his home telephone number is HOllywood 8–4321. In such a use Mr. John Doe's card would be arranged so that the business information would appear at the opening designated for business and under the spur 51 at that opening, when the letter D on the index is opposite that opening, whereas, the other side of the card would appear in the other opening 50 designed to disclose personal information when the index showing the letter D is opposite that opening 50 and Mr. John Doe's card appears under the spur 51 mounted in that opening 50.

It will be understood that in lieu of arranging the directory so that, for instance, business information is displayed on one side of the cards 30, and personal information on the other side thereof, for viewing in opposite openings 50, the cards 30 can be arranged to carry the same type of information on both sides thereof, and the index can be arranged so that, say, cards applicable to one-half of the alphabet appear face up at one opening 50, and the opposite side of the cards showing the second half of the alphabet appear face up at the other opening 50.

While the instant invention has been shown and described herein in what is conceived to be the most practical and preferred embodiment thereof, it is recognized that departures may be made therefrom within the scope of the invention which is, therefore, not to be limited to the details disclosed herein, but is to be accorded the full scope of the claims so as to embrace any and all equivalent devices.

It will be recognized that the kind of information which may be shown on the cards is infinite, so that the device is not limited to use as a telephone directory, but may be used as a rapid-finding index for credit information, sales data, production figures, delivery schedules, and other desired information, and may be indexed for not only names, but also for geographical locations, company divisions, articles of sale, and parts of devices, to use a few examples.

It will also be recognized that the device is adaptable for general use as a directory or card index and need not be confined to use with a telephone.

Having thus described the invention, what I claim as new and desire to secure by Letters Patent is:

1. A directory comprising a base, a circular ring disc slideably mounted on the base having a series of knobs rigidly mounted at the perimeter thereof and having an index system at the perimeter thereof spaced apart by the knobs, a raised platform on said disc spaced inwardly from the knobs and index system, said platform having grooves extending radially thereon, a collar at the inside edge of the disc abutting on the platform, index cards removably mounted in the grooves, and a cover mounted on the base, spanning the platform, and having a viewing port therein above the cards.

2. A card index comprising a base, a circular ring disc slideably mounted on the base, a series of knobs rigidly mounted at the perimeter of the disc, an index system disposed between said knobs, a raised platform mounted on the disc and spaced inwardly from the knobs and index system, grooves extending radially on the platform, a collar at the inside edge of the disc, a channel in the inside surface of the collar, index cards removably mounted in said grooves and channel, a cover mounted on the base and spanning the platform, and a viewing port in the cover above the cards.

3. A card index comprising a base, a circular ring disc slideably mounted on the base, a series of knobs rigidly mounted at the perimeter of the disc, an index system disposed between said knobs, a raised platform mounted on the disc and spaced inwardly from the knobs and index system, grooves extending radially on the platform, a collar at the inside edge of the disc, a channel in the inside surface of the collar, index cards, protruding spurs on the index cards removably inserted in the grooves and channel and adapted to hold the cards in upright position, a cover extending inwardly from the outside circumference of the platform, supported on the base internally from the collar, and a viewing port in the cover above the cards.

4. A card index comprising a base, a circular ring disc slideably mounted on the base, a series of knobs rigidly mounted at the perimeter of the disc, an index system disposed between said knobs, a raised platform mounted on the disc and spaced inwardly from the knobs and index system, grooves extending radially on the platform, a collar at the inside edge of the disc, a channel in the inside surface of the collar, index cards, protruding spurs on the index cards removably inserted in the grooves and channel and adapted to hold the cards in upright position, means on the outside circumference of the platform for releasably retaining the spurs on the cards in position in the grooves and channel, a cover extending inwardly from the outside circumference of the platform, supported on the base internally from the collar, and a viewing port in the cover above the cards.

5. A card index comprising a base, a circular ring disc slideably mounted on the base, a series of knobs rigidly mounted at the perimeter of the disc, an index system disposed between said knobs, a raised platform mounted on the disc and spaced inwardly from the knobs and index system, grooves extending radially on the platform, a collar at the inside edge of the disc, a channel in the inside surface of the collar, index cards, protruding spurs on the index cards removably inserted in the grooves and channel and adapted to hold the cards in upright position, means on the outside circumference of the platform for releasably retaining the spurs on the cards in position in the grooves and channel, a cover extending inwardly from the outside circumference of the platform, supported on the base internally from the collar, a viewing port in the cover above the cards, and lighting means mounted adjacent the viewing port and adapted to illuminate the index cards at the viewing port.

6. A circular card index comprising a ring disc freely rotatably mounted on a stationary base, an index system disposed around the perimeter of the disc, a series of index cards keyed to the index system, said cards being removably mounted radially on said disc inwardly from the index system, a cover disposed inwardly from the index system above said cards, and spanning said cards, a viewing port in the cover above said cards, a flip pointer mounted on the cover, extending into the viewing port and adapted to releasably contact and hold any selected card in position under the flip pointer, whereby, when the disc is rotated index cards correlated to the index system will flip past the viewing port until the desired indicia of the index system is adjacent to the viewing port, whereupon the cards correlated to the desired indicia will be in position under the viewing port and any particular card may be moved and releasably held in position under the flip pointer.

References Cited in the file of this patent

UNITED STATES PATENTS

| | | |
|---|---|---|
| 1,126,645 | Lo Rentz | Jan. 26, 1915 |
| 1,761,604 | Webber | June 3, 1930 |
| 2,314,705 | Johnson | Mar. 23, 1943 |
| 2,568,819 | Olevin | Sept. 25, 1951 |